Aug. 22, 1967  M. SHULKIN  3,337,228

AUXILIARY CASTER FOR HAND TRUCKS

Filed April 8, 1965

INVENTOR.
MIKE SHULKIN

BY

ATTORNEY

United States Patent Office 3,337,228
Patented Aug. 22, 1967

3,337,228
AUXILIARY CASTER FOR HAND TRUCKS
Mike Shulkin, 13404 E. 9th Ave.,
Opportunity, Wash. 99216
Filed Apr. 8, 1965, Ser. No. 446,679
3 Claims. (Cl. 280—47.27)

This invention relates to improvements in auxiliary caster for hand trucks and, more particularly, to a castered leg adopted to be clamped to the frame member of a conventional two-wheeled hand truck to adopt the same for use as a dolly when the main bearing surface of the hand truck is disposed in a substantially horizontal plane.

It is an important object of this invention to provide an auxiliary caster structure adopted to be clamped to a frame member of a conventional hand truck in a quick and easy manner, with simple tools, and designed and adapted to prevent rotational displacement relative the hand truck frame under normal conditions of use of the truck as a dolly. Another object of this invention is concerned with providing an auxiliary caster which may be simply and easily adjusted to vary the distance by which the castered wheel is disposed from the frame so that when the frame is substantially horizontal the castered wheel and the normal hand truck wheels approximately equally bear weight on the supporting surface. A further object of this invention is concerned with the provision of a clamp-on auxiliary caster in which the clamping elements are of such size and length as to substantially embrace the various radial dispositions of the castered wheel when a hand truck is being used as a dolly. Other objects and advantages of the invention will become more apparent during the course of the following description of the invention, and the drawings supplied herewith, wherein:

Figure 1:
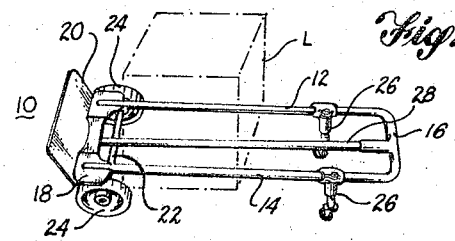
FIGURE 1 is a perspective view illustrating a hand truck provided with auxiliary caster means according to this invention as the same would appear when being used as a dolly.
Figure 4:
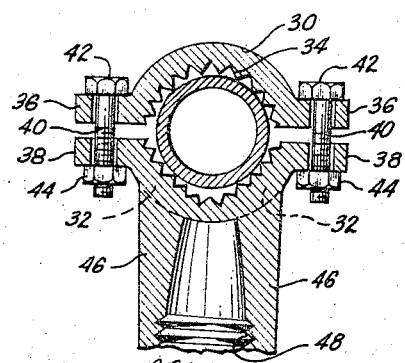
FIGURE 4 is a fragmentary vertical cross-section view taken along lines 4—4 of FIGURE 2.

In a general way this invention comprises an auxiliary caster means for hand trucks of the type having an open-work frame and a pair of non-castered wheels near one end. On that side of the frame opposite which a load is disposed the auxiliary caster means is mounted. A two-part clamp is provided for engagement about a frame member of the hand truck remote from the non-castered wheels. This clamp includes a pair of jaw members oppositely grooved in part to embrace the frame member. Outstanding and opposed flanges are provided on the sides of the jaw members. Fasteners, preferably bolts and nuts, pass through the flanges and secure the same together in clamping relation. A leg extends from one of the jaw members in such manner that when the apparatus is attached to a hand truck the axis of the leg is substantially parallel to the plane of rotation of the hand truck wheels. There is a castered wheel on the outer end of this leg. It is desirable that the length of the leg be such that the surface of the castered wheel which contacts a supporting surface will lie in the same plane as the surface contacting parts of the non-castered wheels. Thus, when the hand truck frame is substantially horizontal, the castered wheel, or castered wheels, as the case may be, will bear their share of the weight along with the non-castered wheels when the hand truck is used as a dolly.

More specifically, with reference to the accompanying drawings, a typical hand truck 10 has an open work frame including side longitudinal members 12 and 14 joined at their upper or outer end by cross-member 16 which may serve as a handle to manipulate the hand truck. At the foot of the hand truck is a frame cross-member 18 having the usual outstanding lip 20 which is normally engaged under a load to be moved as when the hand truck is used in its usual upright position. An axle 22 is suitably journaled on the rear side of the frame 18 and has a pair of non-castered wheels 24, 24.

The auxiliary caster apparatus of this invention is designated as a whole by the numeral 26. Under certain circumstances a single auxiliary caster assembly 26 may be used instead of the pair shown in FIGURE 1. In that case, the auxiliary caster would preferably be attached to an intermediate frame member 28, commonly found in hand trucks in current use. Or, as shown, a pair of castered leg assemblies may be used.

Figure 2:
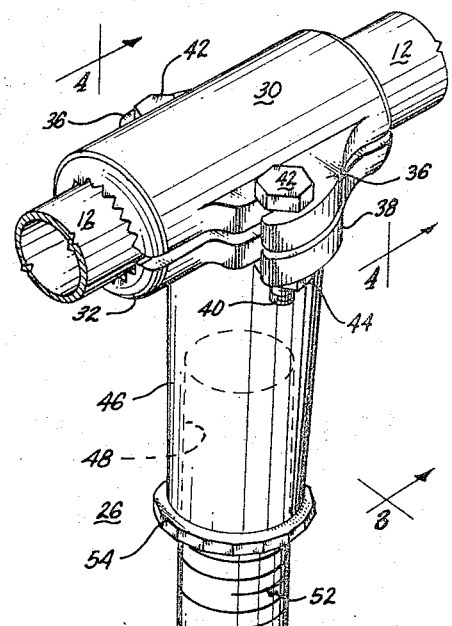
FIGURE 2 is an enlarged perspective view of an auxiliary caster element of this invention.
Figure 3:
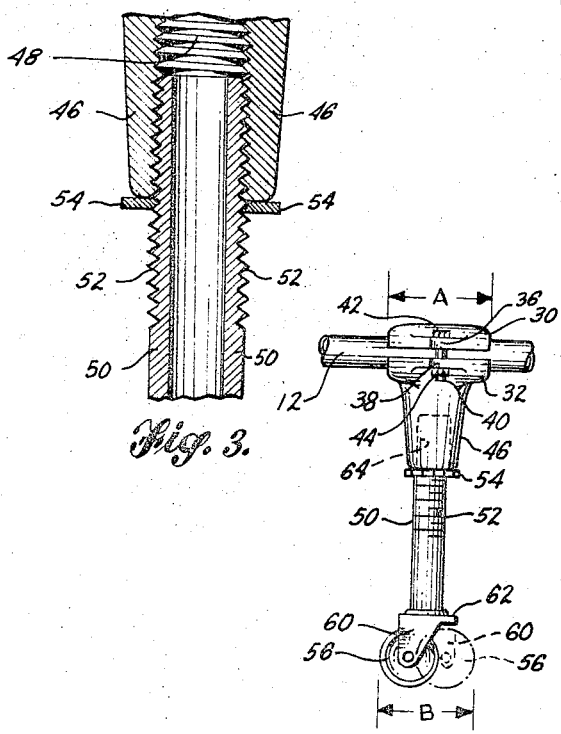
FIGURE 3 is an enlarged detailed view in cross section taken in the plane 3—3 of FIGURE 2.

Referring to FIGURE 2, the hand truck frame member 12 is engaged by a two-part clamp comprising jaw members 30 and 32 which are internally grooved to provide teeth to grip the outer surface of frame member 12. These jaw members, in their grooves, may be provided with sharp pointed ribs or teeth 34 which under pressure will bite into or very tightly grasp the frame member to prevent rotation of the two-part clamp to radial dispositions relative number 12, other than that desired. Flanges 36 and 38 outstand on each side of the respective jaw members 30 and 32 in opposed relationship. Preferably the flanges 36 have open mouth notches 38 to receive a fastening bolt 40. In this instance I prefer to provide the flange 28 with a single hole to receive the shank of bolt 40 having the usual head 42 and which is secured in place by nut 44. By notching the flanges 38 the assembly of the two-part clamp onto a hand truck frame member is considerably facilitated.

Jaw member 32 has, normal to its gripping groove, a rigid shank 46 which is bored out and threaded as at 48. A tube 50, externally threaded at 52 mates with the threads 48 whereby is provided an extensible-contractible leg. When the desired degree of adjustment is obtained by either running the leg 50 in or out of the shank 46 the desired amount, lock nut 54 is tightened to jam against the outer end of the shank 46 to maintain the adjusted relationship.

Castered wheel 56 is mounted on axle 58 between a pair of depending caster arms 60, forming part of the caster hood 62, has pin 64 mounted in the outer end of the tube 50 and there secured in the conventional manner.

Figure 5:
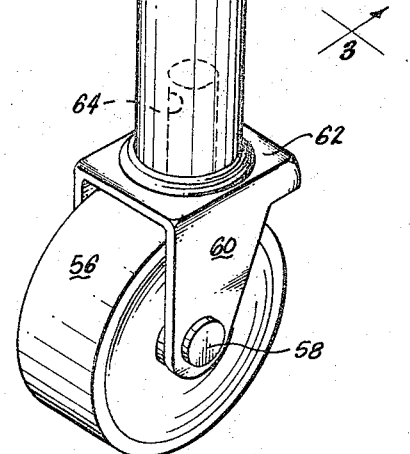
FIGURE 5 is a schematic view in reduced scale illustrating a desired relationship between opposed dispositions of the castered wheel and the clamping means of the apparatus.

The length of the opposed jaw members 30 and 32 forming the two-part clamp is indicated as A in FIGURE 5. The maximum opposed disposition of the caster wheel 56 in its various radial dispositions swings through a circle of 360° has been indicated as B in FIGURE 5, being the diameter of such circle. Practical experience has taught that it is desirable and preferable that the dimension A be as great as or slightly greater than the dimension B. This prevents any tendency of the leg of the auxiliary caster apparatus to over-turn or to apply undue forces and stresses on the frame member when an obstacle is encountered. In this regard it must be borne in mind that when the hand truck is used as a dolly it frequently may be rolled over rough surfaces such as thresholds wherein there is an abrupt change from the normal horizontal plane of the supporting surface to an angular condition could very well produce the over-turning force referred to.

The versatility and usefulness of this auxiliary caster for hand trucks will be readily apparent to those skilled in the art. By the apparatus described it will be seen that a very firm, non-rotative, and non-overturning engagement is obtained between the clamp means apparatus and the frame member of a hand truck. It will also be seen that length of the leg may be readily adjusted to accommodate this auxiliary caster to a variety of sizes of hand trucks to insure that the disposition of the caster wheel 56 is approximately the same distance from the main plane of the frame as is the bearing surface of the non-castered wheels. In FIGURE 1 a load L is shown on the hand truck in the dolly disposition. When a load is to be borne the dolly should be "light" on that end of the frame which has the auxiliary caster either singly or in pairs may be used. This may be arranged and provided by appropriately selecting that position on the open-work frame 12, 14, and/or 28 that is such that the load L will apply its weight closer to the axle 22 of wheels 24 than to the axis of rotation of the caster wheels 56. This is easily accomplished by engaging the two-part clamp either closer to or away from axle 22 as practical experience indicates. It is an advantage to have such a capability as it is highly desirable that wheels 56 be substantially smaller and lighter in weight than wheels 24. Also, by reason of this capability and by reason of the inherent advantages of the relative length A of the clamping apparatus to the circle of rotation B of the castered wheels 56, the necessity of longitudinal or lateral braces on the extensible-contractible leg of the auxiliary caster is obviated.

It will be apparent from the foregoing that a apparatus as described will accomplish the objects of the invention that is set forth before and that during the course of a reading of the foregoing disclosure other objects have been indicated and their satisfaction will be apparent. The foregoing describes and illustrates the preferred embodiment of this invention. However, it will be understood that there are modifications and alternations which may be made that are substantially equivalent to that shown. All such as follow within the fair scope of the subjoining claims are intended to be embraced by this patent in accordance with the applicable interpretation of the doctrine of equivalents.

What is claimed is:
1. Auxiliary caster means for hand trucks, comprising:
   a hand truck having an open-work frame including a substantially planar load-receiving portion and a pair of non-castered wheels near one end of the frame;
   a two-part clamp for engagement about a hand truck frame member at a location remote from the main wheels of said truck, said clamp comprising a pair of jaw members oppositely grooved to in part embrace the frame member and to protrude beyond the planar load-receiving portion, there being opposed flanges on said jaw members and fasteners passing therethrough to secure the same together in clamping relation;
   a leg extending from one of said jaw members of said clamp in a plane substantially parallel to said hand truck wheels,
   a castered wheel on the outer end of said leg, said leg being of such length that when the hand truck frame is substantially horizontal the castered wheel and hand truck wheels both will bear weight from a supporting surface; and
   said clamp jaw members engaging the hand truck frame member over a distance greater than and embracing said castered wheel in its various radial dispositions.

2. The structure according to claim 1 including means for varying the length of said leg relative said clamp.

3. The structure according to claim 2 in which said means for varying the length of said leg include mating threaded elements between said clamp and said leg.

References Cited

UNITED STATES PATENTS

| | | | |
|---|---|---|---|
| 558,720 | 4/1896 | Brock | 16—19 |
| 676,163 | 6/1901 | Victor | 280—47.27 X |
| 965,031 | 7/1910 | Slatter | 280—47.32 |
| 2,745,117 | 5/1956 | Sands | 16—29 X |
| 3,104,889 | 9/1963 | Branch | 280—47.29 X |

BENJAMIN HERSH, *Primary Examiner.*

J. A. PEKAR, *Assistant Examiner.*